United States Patent
Cisneros

(10) Patent No.: US 8,333,394 B1
(45) Date of Patent: Dec. 18, 2012

(54) BUCKET STAND

(76) Inventor: Carlos E. Cisneros, Hayward, CA (US)

( * ) Notice: Subject to any disclaimer, the term of this patent is extended or adjusted under 35 U.S.C. 154(b) by 394 days.

(21) Appl. No.: 12/268,664

(22) Filed: Nov. 11, 2008

(51) Int. Cl.
*B62B 1/00* (2006.01)

(52) U.S. Cl. .................. 280/79.5; 280/47.34; 280/47.35

(58) Field of Classification Search .................. 280/79.5, 280/79.11, 47.16, 43.22, 47.34, 47.35; 220/4.27, 220/23.87, 23.89, 4.26
See application file for complete search history.

(56) References Cited

U.S. PATENT DOCUMENTS

| | | | |
|---|---|---|---|
| 196,396 A | 3/1877 | Sprague | |
| 2,683,014 A | 7/1954 | L.M. Sumen et al. | |
| 4,244,147 A * | 1/1981 | Geddes | 327/346 |
| 4,398,690 A | 8/1983 | Rutledge | |
| 4,574,969 A * | 3/1986 | Mays | 220/8 |
| 5,183,280 A | 2/1993 | Gresch | |
| 5,190,303 A | 3/1993 | Schumacher et al. | |
| 5,232,187 A | 8/1993 | O'Farrell et al. | |
| 5,325,990 A | 7/1994 | Temple | |
| 5,429,378 A * | 7/1995 | Durel-Crain | 280/43.22 |
| 5,531,351 A * | 7/1996 | Logsdon | 220/571.1 |
| 5,772,033 A * | 6/1998 | Loftus et al. | 206/506 |
| 5,971,333 A * | 10/1999 | Fiedor | 280/47.35 |
| 6,027,128 A * | 2/2000 | Stich et al. | 280/47.16 |
| 6,135,467 A | 10/2000 | Tagariello | |
| 6,176,500 B1 * | 1/2001 | Clement et al. | 280/79.5 |
| RE37,350 E * | 9/2001 | Stephan | 280/79.5 |
| 6,419,246 B1 | 7/2002 | Neal | |
| 6,637,156 B2 * | 10/2003 | Stewart | 47/82 |
| 6,695,325 B2 | 2/2004 | Carrillo | |
| 6,715,627 B1 * | 4/2004 | Bonner et al. | 280/79.5 |
| 6,851,566 B1 | 2/2005 | Bonner | |
| 6,935,644 B1 * | 8/2005 | Oranday | 280/47.34 |
| 7,036,669 B1 * | 5/2006 | Brown | 211/85.24 |
| 7,845,656 B2 * | 12/2010 | Thompson | 280/79.5 |
| 2007/0290471 A1 * | 12/2007 | Sexton | 280/79.5 |

* cited by examiner

*Primary Examiner* — Hau Phan
(74) *Attorney, Agent, or Firm* — Haverstock & Owens LLP

(57) ABSTRACT

A bucket stand is described herein. The bucket stand has a body for receiving and supporting cylindrical objects such as paint containers. Within the body is a padding for securing the cylindrical objects, so that when a user lifts the cylindrical object, for example, the paint container's handle, the bucket stand is lifted too. This permits better portability of both objects without having to separate them and carry each individually. Furthermore, the cylindrical object is only temporarily secured within the bucket stand for easy removal of the object when desired. The bucket stand is also able to be further elevated and includes wheels to enable sliding of the stand. Additional padding is utilized to allow various sizes of cylindrical objects to be retained. Some embodiments utilize angled walls, magnets and fasteners to further assist in securing the cylindrical objects within the bucket stand.

31 Claims, 4 Drawing Sheets

BUCKET STAND

FIELD OF THE INVENTION

The present invention relates to the field of containers. More specifically, the present invention relates to the field of bucket stands for receiving containers.

BACKGROUND OF THE INVENTION

Buckets and other similar containers serve a primary purpose of storing an object in a closed area, such as paint or other liquids. Depending on the size of the bucket, it is generally not very easy to move around, nor carry up a ladder. Specifically, a typical sized bucket of paint is cylindrically shaped, has a flat circular bottom and weighs quite a few pounds. It is difficult or awkward to try to position the bucket of paint on a ladder. Even when painting at ground level, since the paint can or bucket is very short with respect to the height of the painter, it is awkward and strenuous to continuously bend over to reach the paint can. Furthermore, to simply move the bucket of paint from one side of the room to another is difficult due to the heaviness of the bucket and the concern of spillage since the can is wobbly when held by the handle. There have been many attempts at overcoming the difficulties of moving buckets around and using them in elevated positions.

U.S. Pat. No. 5,183,280 to Gresch, discloses a multi-purpose bucket attached to a skirt for elevation. The device is an elevating apparatus with a one-sized bucket permanently affixed to it. The container is elevated by means of the skirt with only one height possible. Furthermore, slots are provided in the skirt as handholds for moving the skirt and bucket around.

U.S. Pat. No. 5,325,990 to Temple, discloses a pivoting third leg on the second leg of a two-leg container support. A support is provided that is readily attached and detached from the stand. Flanges are used to allow for easy attaching and detaching. These flanges must be attached to the container with adhesive or suitable fasteners such as nuts and bolts. The three support legs form a triangular area beneath the container. All three legs are required to keep the container support upright. A relatively small jostle could easily tip the support. Also, the pivoting leg is susceptible to collapse due to even smaller jostles.

U.S. Pat. No. 6,851,566 to Bonner, discloses a nesting bucket apparatus capable of expanding and raising the level of the top bucket. Two buckets are utilized where a track between the buckets allows the inner bucket to be elevated.

U.S. Pat. No. 4,398,690 to Rutledge, discloses a tripod support for paint pails and trays where the tripod is a single-height. The support legs are held rigidly by angle brackets.

U.S. Pat. No. 196,396 to Sprague and U.S. Pat. No. 2,683,014 to Sumen disclose stools and holders of pails with thin legs as support. Furthermore, they utilize special devices to hold the pail together with the stand such as bolts or spring-loaded hooks.

SUMMARY OF THE INVENTION

A bucket stand is described herein. The bucket stand has a body for receiving and supporting cylindrical objects such as paint containers. Within the body is a padding for securing the cylindrical objects, so that when a user lifts the cylindrical object, for example, the paint container's handle, the bucket stand is lifted too. This permits better portability of both objects without having to separate them and carry each individually. Furthermore, the cylindrical object is only temporarily secured within the bucket stand for easy removal of the object when desired. The bucket stand is also able to be further elevated and includes wheels to enable sliding of the stand. Additional padding is utilized to allow various sizes of cylindrical objects to be retained. Some embodiments utilize angled walls, magnets and fasteners to further assist in securing the cylindrical objects within the bucket stand.

In one aspect, an apparatus for receiving, supporting and elevating a paint container comprises an aperture for receiving the paint container and a body containing the aperture, wherein the body utilizes friction to retain the paint container. The apparatus further comprises a padding coupled to the body for securing the paint container within the body. The apparatus further comprises a set of additional padding to allow varying sizes of paint containers to be secured. The apparatus further comprises a set of wheels for sliding the body. The set of wheels extend to adjust the height of the body. The apparatus further comprises a mechanism for adjusting the height of the body. The apparatus further comprises one or more magnets coupled to the body for assisting in securing the paint container within the body. The apparatus further comprises one or more fasteners for assisting in securing the paint container within the body. The paint container and the body are able to be separated after the paint container is received. The paint container and the body are carried together using a handle of the paint container. The body is rubber or plastic. The padding is rubber. Alternatively, the body is a shell. The shell comprises a plurality of legs and a base. The body further comprises an angled interior for receiving the paint container.

In another aspect, an apparatus for receiving, supporting and elevating a paint container selected from various sizes of paint containers comprises a body, a padding coupled to the body, a set of additional padding selectively inserted between the padding and the paint container for securing the paint container, an aperture within the padding for receiving the paint container, a set of wheels for sliding the body and a mechanism for adjusting the height of the body, wherein the paint container and the body are carried together using a handle of the paint container. The apparatus further comprises one or more magnets coupled to the body for assisting in securing the paint container within the body. The apparatus further comprises one or more fasteners for assisting in securing the paint container within the body. The paint container and the body are able to be separated after the paint container is received. The body is rubber or plastic. The padding and the set of additional padding are rubber. Alternatively, the body is a shell. The shell comprises a plurality of legs and a base. The body further comprises an angled interior for receiving the paint container.

In yet another aspect, a method of receiving, supporting and elevating a paint container within a bucket stand comprises determining if the paint container fits securely within the bucket stand, adding padding within the bucket stand to ensure the paint container fits securely within the bucket stand and inserting the paint container into the bucket stand. The method further comprises applying additional downward force on the paint container to ensure the paint container is secured within the bucket stand. The method further comprises adjusting the height of the bucket stand. The method further comprises moving the paint container and the bucket stand using a handle of the paint container. The method further comprises removing the paint container from the bucket stand. The method further comprises sliding the paint container and the bucket stand using a set of wheels on the bucket stand. The bucket stand comprises an aperture for receiving the paint container and a body containing the aperture, wherein the body utilizes friction to retain the paint container. More specifically, the bucket stand comprises a body, a padding coupled the body, a set of additional padding inserted between the padding and the paint container for securing the paint container, an aperture within the padding for receiving the paint container, a set of wheels for sliding the body and a mechanism for adjusting the height of the body.

In another aspect, an adaptable paint bucket stand comprises a body shaped to receive a cylindrical paint container, a rubber padding coupled to the interior of the body for securing the paint container within the body, a set of additional padding selectively inserted between the rubber padding and the paint container for further securing the paint container, a plurality of legs coupled to the body wherein the plurality of legs are adjustable, a set of wheels coupled to the legs for sliding the body, one or more magnets coupled to the body for assisting in securing the paint container within the body and one or more fasteners for assisting in securing the paint container within the body. The paint container and the body are able to be separated after the paint container is received. The set of additional padding is rubber.

DETAILED DESCRIPTION OF THE PREFERRED EMBODIMENT

The present invention overcomes the prior art shortfalls by providing a bucket stand that receives variable sized buckets, is separate from the bucket but is able to be temporarily coupled to the bucket, elevates the bucket and allows a user to carry the bucket and bucket stand together.

Figure 1A:
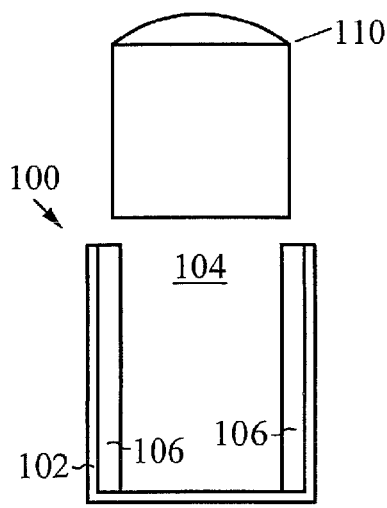
FIG. 1A illustrates a side cross-sectional view of the preferred embodiment of the present invention.
Figure 2:
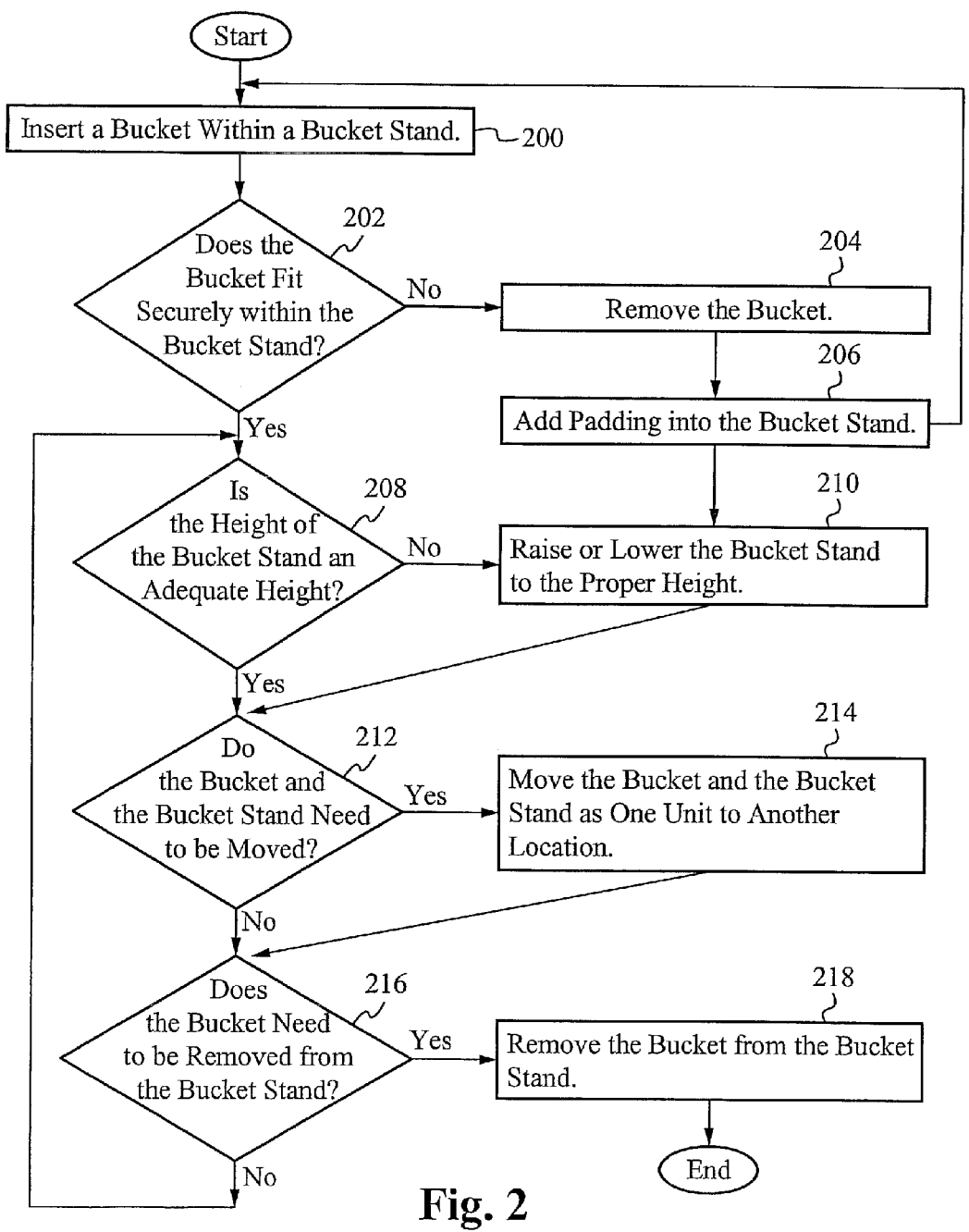
FIG. 2 illustrates a flowchart of the preferred embodiment of the present invention.

FIG. 1A illustrates a side cross-sectional view of the preferred embodiment of the present invention. A bucket stand 100 includes a body 102 and a circular aperture 104 wherein padding 106 is positioned between the aperture 104 and the body 102. Initially, the padding 106 is uncompressed. Furthermore, the padding 104 is any material that functions according to the described implementation, and includes but is not limited to rubber and a foam-like material. In particular, the material should have the ability to be compressed from its original state, but also a high recovery back to its original state. The padding 106 is positioned such that when a bucket 110 is inserted within the aperture 104, the bucket 110 becomes wedged in the aperture 104, and the bucket 110 and bucket stand 100 are temporarily coupled due to friction and the force of the compressed padding 106' (FIG. 2). The padding 106 is able to surround the entire inner circumference of the bucket stand 100 or in some embodiments, the padding 106 is in the form of strips (not shown) within the bucket stand 100 placed to retain the bucket 110.

Figure 1B:
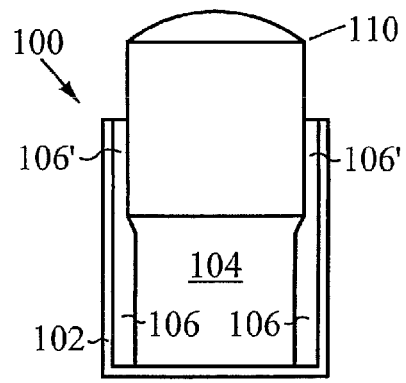
FIG. 1B illustrates a side cross-sectional view of the preferred embodiment of the present invention with a bucket in the bucket stand.

FIG. 1B illustrates a side cross-sectional view of the preferred embodiment of the present invention with a bucket 110 partially received in the bucket stand 100. When the bucket 110 is received within the bucket stand 100, the padding 106 is compressed against the body 102 of the bucket stand 100. As the bucket 110 is further inserted into the bucket stand 100, more of the padding 106 is compressed. The force of the compressed padding 106' secures the bucket 110 within the bucket stand 100, so that a user is able to carry the bucket 110 and the bucket stand 100 together as they are temporarily coupled. Since the method of coupling the bucket 110 and the bucket stand 100 is based on friction and not a permanent means, the bucket 110 is able to be removed from the bucket stand 100 when desired. To remove the bucket 110 from the bucket stand 100 the user simply pulls it out with additional force. For example, if a user inserts a can of paint into the bucket stand 100 to prevent having to bend over frequently while painting, but then after the job is finished, wants to clean out the can of paint, the user will not have to awkwardly try to clean both the paint can and the bucket stand at once. The can of paint is removed first and cleaned separately.

Figure 1C:
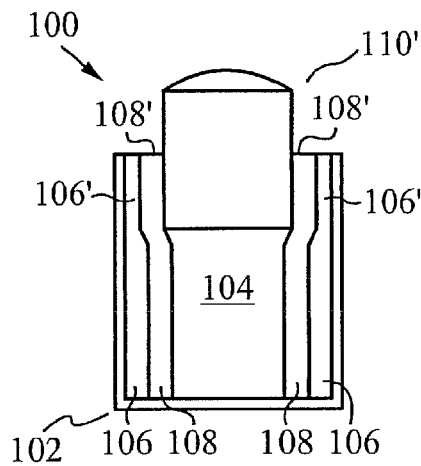
FIG. 1C illustrates a side cross-sectional view of the preferred embodiment of the present invention with a bucket in the bucket stand using additional padding.

FIG. 1C illustrates a side cross-sectional view of the preferred embodiment of the present invention with a bucket 110 in the bucket stand 100 using additional padding. To enable the present invention to receive varying sizes of buckets such as a smaller bucket 110', one or more padding inserts 108 are able to be utilized. The padding inserts 108 function similarly to the padding 106 of the bucket stand 100 wherein the bucket 110 compresses the padding inserts 108 forming compressed padding inserts 108' and compressed padding 106' so that the bucket 110 is held in place by friction. The padding inserts 108 are able to come in a variety of shapes and sizes to ensure that any sized bucket is able to fit securely within the bucket stand 100. Not only do the padding inserts 108 allow the bucket 110 to be secured within the bucket stand 100, since they are only temporary, the bucket 110 is still easily removed from the bucket stand 100 when desired.

Figure 1D:
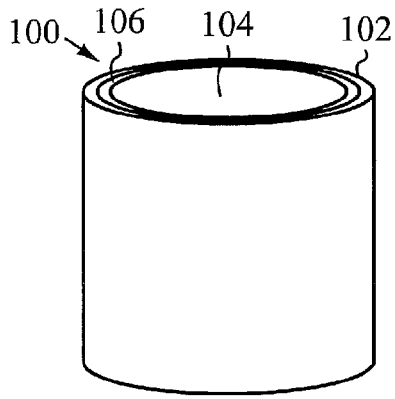
FIG. 1D illustrates a side perspective view of the preferred embodiment of the present invention.

FIG. 1D illustrates a side perspective view of the preferred embodiment of the present invention. As described above, the bucket stand 100, includes the body 102 which surrounds the padding 106 wherein the aperture 104 is within the padding 106. The bucket 110 (FIG. 1A) fits in the aperture 104, within the padding 106, where it is securely held in place.

Figure 1E:
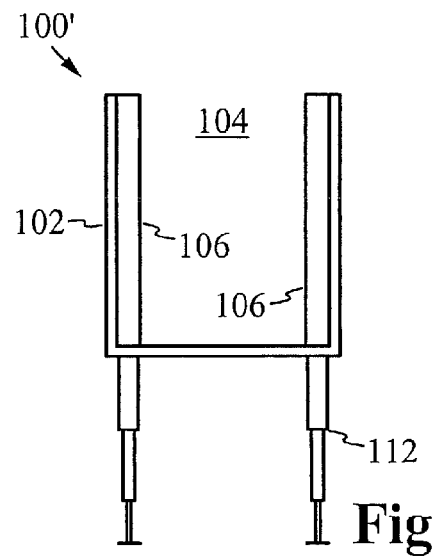
FIG. 1E illustrates a side cross-sectional view of the present invention with extendible feet.

FIG. 1E illustrates a side cross-sectional view of the present invention with extendible feet. A bucket stand 100' with a set of extendible feet 112 allows the bucket stand 100' to be elevated to different heights. The functionality of the bucket stand 100' is the same as that of the bucket stand 100, with the ability to be raised higher or lower off of a surface beneath the extendible feet 112. The extendible feet 112 are implemented using a telescoping means or any other means which provides the ability to change height such as screws which when twisted either retract or extend further out from the bottom of the bucket stand. When the bucket stand 100' does not need to be elevated, the set of retractable feet 112 are able to be consolidated or shortened so the bucket stand 100' has a minimal size.

In other embodiments, the extendible legs include wheels or casters (FIG. 4) to allow the bucket stand to slide across the floor. Locks are further included to enable the bucket stand to be locked in place to prevent it from continuing to slide when the user needs it stationary.

FIG. 2 illustrates a flowchart of the preferred embodiment of the present invention. In the step 200, a user inserts a bucket within a bucket stand. If the bucket does not fit in the bucket stand, in the step 202, then the user removes the bucket from the bucket stand, in the step 204. The user then adds padding to the bucket stand until the bucket does securely fit, in the step 206. More specifically, the additional padding is placed within the bucket stand around the edge to narrow the circumference, and then the bucket is pushed down within the bucket stand. In the step 208, if the height of the bucket stand is not an adequate height, then the user is able to lower or raise the bucket stand as needed in the step 210. If the bucket and the bucket stand are to be moved to another location in the step 212, then the user is able to move the bucket and bucket stand as a unit to that location in the step 214. The user moves the bucket and bucket stand by grabbing the handle of the bucket, and since they are coupled, the bucket and bucket stand are both moved. If the user is finished with his task and no longer needs the bucket within the bucket stand in the step 216, then he is able to easily remove the bucket from the bucket stand in the step 218. To remove the bucket, the user simply pulls it out using additional force while holding down the bucket stand. The user is able to continue the process of modifying the height of the bucket stand and moving it around as needed.

Figure 3:
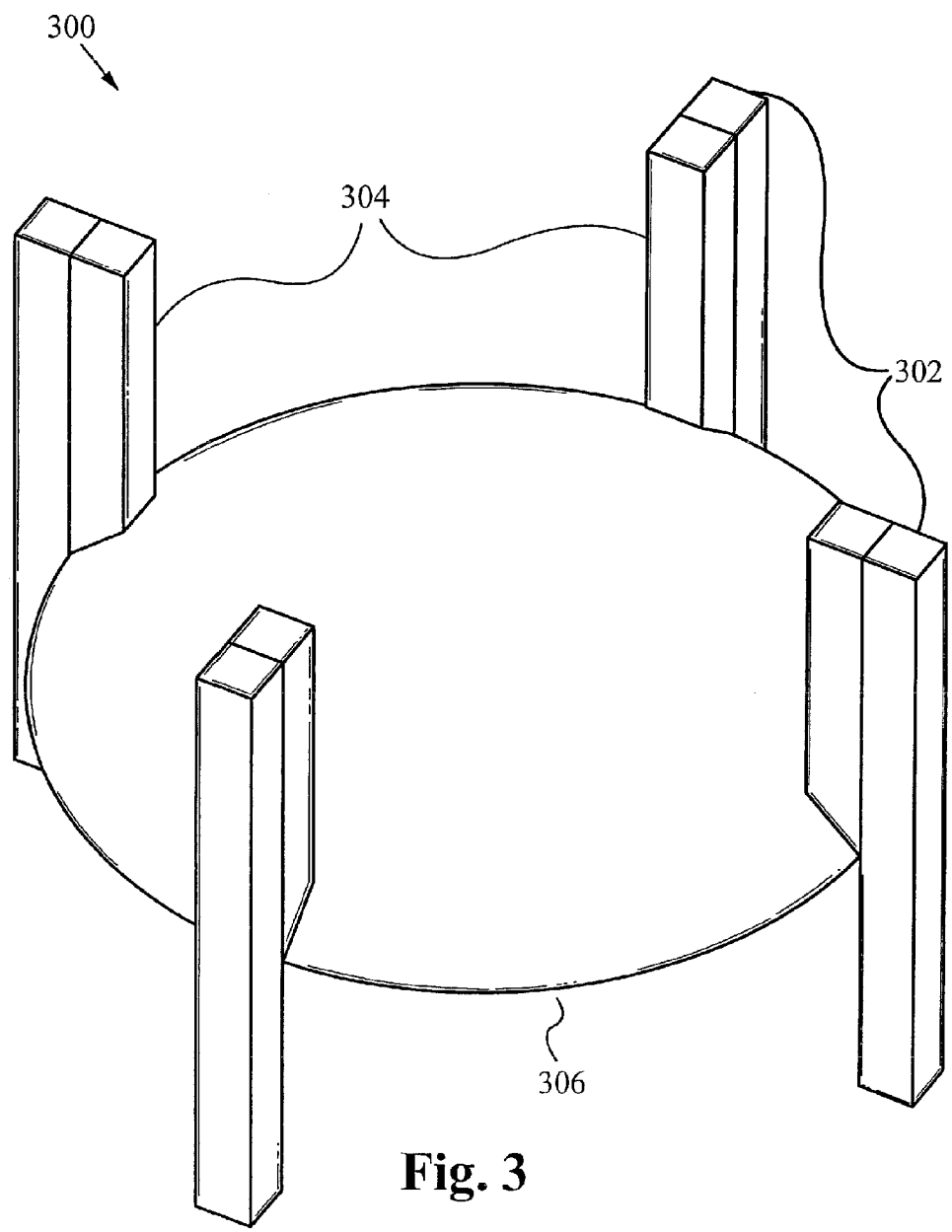
FIG. 3 illustrates a side perspective view of an alternative embodiment of the present invention.

FIG. 3 illustrates a side perspective view of an alternative embodiment of the present invention. A bucket stand 300 includes a plurality of legs 302, padding 304 and a base 306, hence just a shell or frame of material. The plurality of legs 302 are coupled to the base 304. By only including the plurality of legs 302, the weight of the bucket stand 300 is even lighter as there is less material to lift. The padding 304 is attached to each of the legs 302 for receiving and securing a bucket 110 (FIG. 1A). Similar to the preferred embodiment of the present invention, the bucket stand 300 is able to receive the bucket 110 (FIG. 1A) and remain temporarily coupled with it. Then, both the bucket 110 (FIG. 1A) and the bucket stand 300 are able to be carried together using the bucket handle. Although in this embodiment, less material is used to construct the bucket stand 300, it is still very sturdy and able to withstand jostling.

Figure 4:
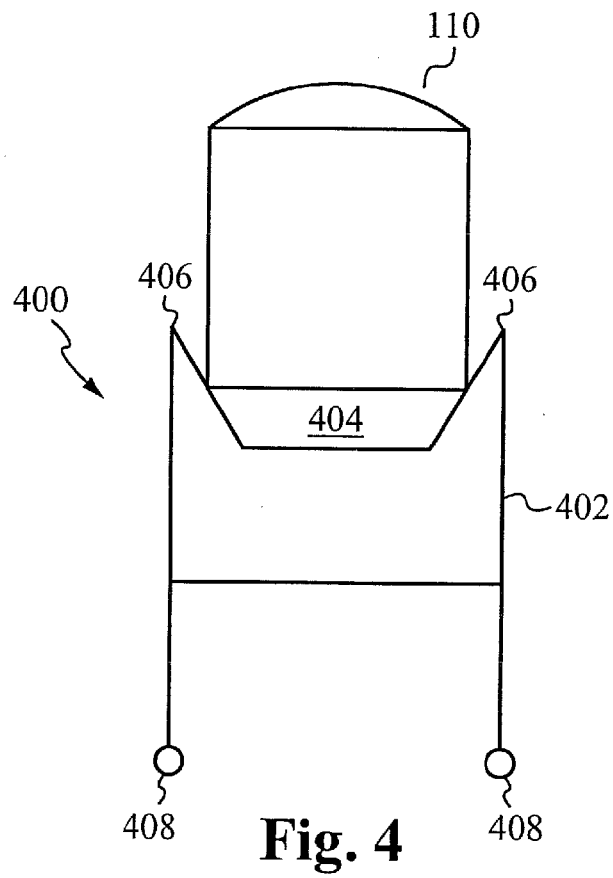
FIG. 4 illustrates a side cross-sectional view of an alternative embodiment of the present invention.

FIG. 4 illustrates a side cross-sectional view of an alternative embodiment of the present invention. A bucket stand 400 includes a body 402 and a circular aperture 404 where the aperture 404 has angled walls 406. The angled walls 406 are angled such that when a bucket 110 is inserted within the aperture 404, the bucket 110 becomes wedged in the aperture 404 and the bucket 110 and the bucket stand 400 are temporarily coupled due to friction. Initially, the bucket 110 enters the top of the aperture 404 where the aperture 404 is the widest. As the bucket 110 travels further into the aperture 404, eventually the circumference of the bucket 110 equals the circumference of the aperture 404 due to the angled walls 406. Upon reaching this position, a slight downward force from the top of the bucket 110 is required to secure the bucket 110 in place. Furthermore, materials that provide additional friction are able to be utilized to provide a more secure fit such as rubber or a rubber-like material where the material is slightly compressed when pushed down, while its elasticity pushes back against the bucket 110 securing it in place. After being secured within the aperture 404, the bucket 110 and the bucket stand 400 are able to be carried as one unit to a different location. Since the aperture 404 has the angled walls 406, buckets of a variety of sizes are able to fit within the bucket stand 400 without having to modify the bucket stand 400. The bucket stand 400 also utilizes a set of wheels 408 to permit easy movement across a floor. To modify the height of the bucket stand 400, the wheels 408 are extendible such that the bucket stand 400 is elevated. In alternative embodiments, other aspects of the bucket stand 400 allow for the height to be modified, such as the bucket stand 400 comprising multiple sections where a device is between the sections to elevate the upper section. Regardless of which implementation is used to elevate the bucket stand 400, by elevating the bucket stand 400, the bucket 110 is also elevated, thus providing the bucket 110 at an even higher elevation. In alternative embodiments, the bucket stand 400 does not have any wheels. In an alternative embodiment, the angled walls 404 have ridges, grooves or tabs for helping to secure the bucket 110 within the bucket stand 400.

Figure 5:
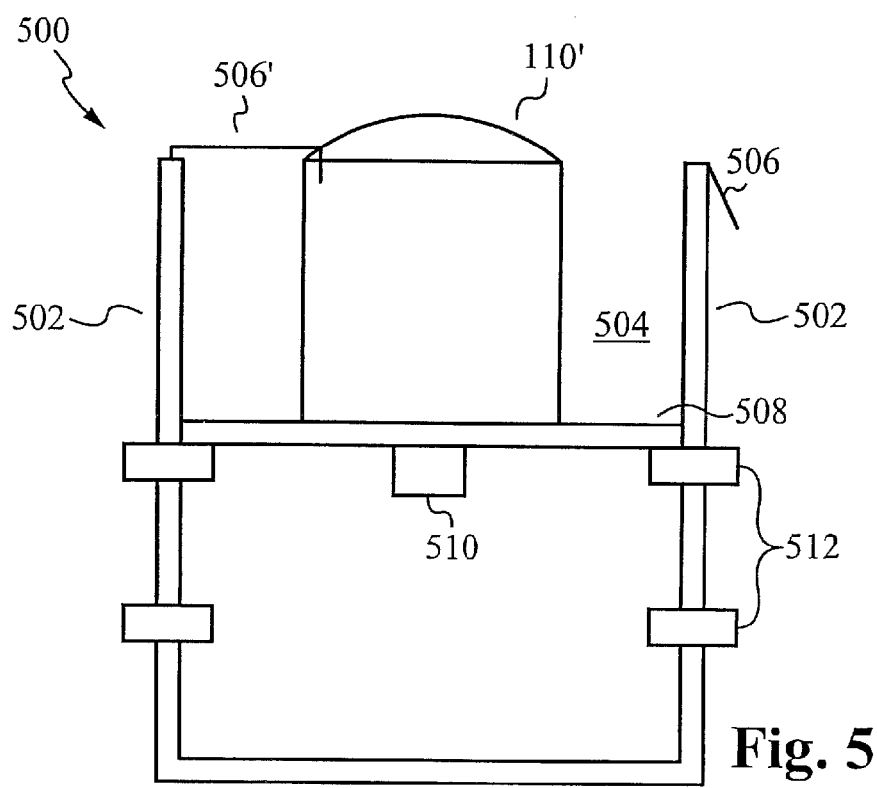
FIG. 5 illustrates a side cross-sectional view of an alternative embodiment of the present invention.

FIG. 5 illustrates a side cross-sectional view of an alternative embodiment of the present invention. A bucket stand 500 includes a body 502, an aperture 504, one or more fasteners 506, a movable base 508 and a magnet 510. The one or more fasteners 506 are coupled to the body 502 of the bucket stand 500 for securing a bucket 110' within the aperture 504 of the bucket stand 500. The bucket 110' rests on the base 508 and then is pulled down or against the body 502 depending on the location of the fasteners 506. With the fasteners 506 as shown, the bucket 110' is pulled towards the body 502 of the bucket stand 500. The fasteners 506 are constructed of an elastic material coupled to a hook-like device. The elastic material stretches and the hook grabs the bucket 110' such as the fastener 506'. In other embodiments, other types of fasteners are used to secure the bucket 110'. The benefit of using an elastic fastener is that it easily accommodates varying sizes of buckets. As shown, the small bucket 110' is secured with the base 508 elevated by a set of pins 512. For a larger bucket, the base 508 is able to be moved to the lower set of pins 512. Therefore, many different sizes of buckets are able to be retained within the bucket stand 500. In other embodiments, instead of using the pins 512 to move the base 508, other implementations are possible such as ridges (not shown) that the base 508 fits into. For metal buckets, a magnet 510 is coupled to the base 508 for assisting in retaining the bucket within the bucket stand 500. Although the fasteners 506 and the magnet 510 are specifically described in this embodiment, they are usable in the other embodiments as well.

To utilize the present invention, the bucket stand is prepared to receive a bucket by adding padding so that the bucket fits securely within the bucket stand. Additional pressure is applied to ensure the bucket is secured within the bucket stand. Thereafter, the bucket and bucket stand are temporarily coupled and are able to be moved as one unit wherein a user is able to grasp the bucket handle and move both objects. The bucket stand itself allows a user to position a bucket at an elevated height. Moreover with added functionality, the bucket stand is able to change its height so that the bucket within the bucket stand is reachable at varying heights. To modify the height, any number of implementations are possible, for example, the wheels are extendible to add height. The wheels also provide sliding movement across the ground. In embodiments without wheels, feet and extendible legs are utilized to heighten the bucket stand. After a user is finished using the bucket within the bucket stand, he is able to remove the bucket by pulling it out, thus severing the temporary coupling.

An example is used herein to demonstrate the present invention according to the preferred embodiment in operation. A father and son are painting the walls of a room. The father is six feet tall while the son is only four feet. The father allows the child to start painting, but before he does, they utilize the present invention to assist them. They place the paint can within the bucket stand, but the paint can is too narrow to securely fit. So they remove the paint can and add additional padding so that the bucket does securely fit. Furthermore, the paint can is pushed down with adequate force so that the can not only is stationary, but when picking up the paint can by its handle, the bucket stand is also picked up. Since the son is much shorter than the father, the bucket stand is set at a lower height. Specifically, the bucket stand is set at a height so that the son is able to easily reach the paint can without having to bend over. As the son finishes part of the wall, he needs to move the paint can and bucket stand over. He is able to do this using the wheels of the bucket stand. However, when he reaches one corner of the room where there are some small objects in the way such that rolling the bucket stand is not possible, the son is able to lift the paint can and bucket stand together as described above and move them around the objects. The painting is thus able to continue without difficulty of disassembling or heavy lifting. Upon finishing the wall, the son quits and the father resumes the painting. The paint can is still within the bucket stand, but at an inadequate height for the father. However, the bucket stand's height is able to be modified and set to compensate for the father's height. After two walls are finished the paint can is empty and must be replaced. The father is able to easily remove the paint can and properly dispose of it. An additional paint can is inserted and the father finishes painting the room. After finishing, the father is able to remove the second paint can and store it with the rest of the paint and not with the bucket stand still attached to it.

The bucket stand is preferably constructed of a material that is light weight such as rubber or plastic and is able to come in any shape or size. Preferably the shape and size are such that the bucket stand is easily carried, yet able to hold a variety of sizes of buckets or containers. In some embodiments, the bucket stand is a large bucket comprising the additional features to make it the bucket stand. The bucket stand described herein is very sturdy and is able to withstand significant jostling without tipping over.

It should be understood that the present invention does not only function to retain buckets. Rather, any object of a substantially cylindrical shape, such as a paint can, is able to be received by the bucket stand described herein.

Furthermore, although some embodiments comprise elements which other embodiments do not, it should be understood that the components of the different embodiments are interchangeably usable on all of the embodiments. For example, although the fasteners are not described with the preferred embodiment, it should be understood that to further secure the bucket within the bucket stand, fasteners are able to be added.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. An apparatus for receiving, supporting and elevating a paint container comprising:
    a) an aperture for receiving the paint container;
    b) a body containing the aperture, wherein the body utilizes friction to retain the paint container; and
    c) padding coupled to the body and surrounding the entire inside walls of the body, wherein the padding is compressed against the body and completely surrounds the paint container to secure the paint container by the friction fit.

2. The apparatus as claimed in claim 1 further comprising a set of additional padding to allow varying sizes of paint containers to be secured.

3. The apparatus as claimed in claim 1 further comprising a set of wheels for sliding the body.

4. The apparatus as claimed in claim 3 wherein the set of wheels extend to adjust the height of the body.

5. The apparatus as claimed in claim 1 further comprising a mechanism for adjusting the height of the body.

6. The apparatus as claimed in claim 1 further comprising one or more magnets coupled to the body for assisting in securing the paint container within the body.

7. The apparatus as claimed in claim 1 further comprising one or more fasteners for assisting in securing the paint container within the body.

8. The apparatus as claimed in claim 1 wherein the paint container and the body are able to be separated after the paint container is received.

9. The apparatus as claimed in claim 1 wherein the paint container and the body are carried together using a handle of the paint container.

10. The apparatus as claimed in claim 1 wherein the body is rubber or plastic.

11. The apparatus as claimed in claim 1 wherein the padding is rubber.

12. The apparatus as claimed in claim 1 wherein the body is a shell.

13. The apparatus as claimed in claim 12 wherein the shell comprises a plurality of legs and a base.

14. The apparatus as claimed in claim 1 wherein the body further comprises an angled interior for receiving the paint container.

15. An apparatus for receiving, supporting and elevating a paint container selected from various sizes of paint containers comprising:
    a) a body;
    b) a padding coupled to the body;
    c) a set of additional padding selectively inserted between the padding and the paint container for securing the paint container;
    d) an aperture within the padding for receiving the paint container;
    e) a set of wheels for sliding the body; and
    f) a mechanism for adjusting the height of the body,
    wherein the paint container and the body are carried together using a handle of the paint container.

16. The apparatus as claimed in claim 15 further comprising one or more magnets coupled to the body for assisting in securing the paint container within the body.

17. The apparatus as claimed in claim 15 further comprising one or more fasteners for assisting in securing the paint container within the body.

18. The apparatus as claimed in claim 15 wherein the paint container and the body are able to be separated after the paint container is received.

19. The apparatus as claimed in claim 15 wherein the body is rubber or plastic.

20. The apparatus as claimed in claim 15 wherein the padding and the set of additional padding are rubber.

21. The apparatus as claimed in claim 15 wherein the body is a shell.

22. The apparatus as claimed in claim 21 wherein the shell comprises a plurality of legs and a base.

23. The apparatus as claimed in claim 15 wherein the body further comprises an angled interior for receiving the paint container.

24. A method of receiving, supporting and elevating a paint container within a bucket stand comprising:
   a) determining if the paint container fits securely within the bucket stand;
   b) adding padding within the bucket stand to surround the entire inside walls of the bucket stand and to ensure the paint container fits securely within the bucket stand wherein the padding is compressed against the body and completely surrounds the paint container to secure the paint container within the bucket stand by friction fit; and
   c) inserting the paint container into the bucket stand.

25. The method as claimed in claim 24 further comprising applying additional downward force on the paint container to ensure the paint container is secured within the bucket stand.

26. The method as claimed in claim 24 further comprising adjusting the height of the bucket stand.

27. The method as claimed in claim 24 further comprising moving the paint container and the bucket stand using a handle of the paint container.

28. The method as claimed in claim 24 further comprising removing the paint container from the bucket stand.

29. The method as claimed in claim 24 further comprising sliding the paint container and the bucket stand using a set of wheels on the bucket stand.

30. The method as claimed in claim 24 wherein the bucket stand comprises:
   a) an aperture for receiving the paint container; and
   b) a body containing the aperture, wherein the body utilizes friction to retain the paint container.

31. The method as claimed in claim 24 wherein the bucket stand comprises:
   a) a body;
   b) a padding coupled the body;
   c) a set of additional padding inserted between the padding and the paint container or securing the paint container;
   d) an aperture within the padding for receiving the paint container;
   e) a set of wheels for sliding the body; and
   f) a mechanism for adjusting the height of the body.

\* \* \* \* \*